United States Patent [19]

Woodhead

[11] Patent Number: 4,699,732
[45] Date of Patent: Oct. 13, 1987

[54] PREPARATION OF DISPERSIBLE CERIUM COMPOUND

[75] Inventor: James L. Woodhead, Didcot, England

[73] Assignee: United Kingdom Atomic Energy Authority, London, England

[21] Appl. No.: 799,851

[22] Filed: Nov. 20, 1985

[30] Foreign Application Priority Data

Nov. 30, 1984 [GB] United Kingdom ............... 8430244

[51] Int. Cl.$^4$ ..................... B01J 13/00; C01F 17/00
[52] U.S. Cl. ................................. 252/314; 252/313.1; 252/315.01; 252/363.5; 423/21.5; 423/263; 423/DIG. 14
[58] Field of Search ............... 252/313.1, 315.01, 314; 423/21.5, 263, DIG. 14

[56] References Cited

U.S. PATENT DOCUMENTS

| | | | |
|---|---|---|---|
| 3,761,571 | 9/1973 | Woodhead | 252/315.01 X |
| 4,231,893 | 11/1980 | Woodhead | 252/313.1 |
| 4,356,106 | 10/1982 | Woodhead et al. | 252/313.1 |

FOREIGN PATENT DOCUMENTS 976328 11/1964 United Kingdom ............. 252/313.1

OTHER PUBLICATIONS

Danielsson: "Adsorption of a Number of Elements from $HNO_3$-HF and $H_2SO_4$-HF Solutions by Cation and Anion Exchange", Acta Chem. Scand. 19, (1965), 1859–1874.

*Primary Examiner*—Richard D. Lovering
*Attorney, Agent, or Firm*—Larson and Taylor

[57] ABSTRACT

The invention provides a process for the preparation of a dispersible cerium compound (i.e. a cerium compound which may be dispersed in a liquid to give a colloidal dispersion (i.e. a sol)).

The process involves replacing a first species of ions associated with the cerium compound by a second species of ions (e.g. hydroxyl ions) and subsequently replacing the second species of ions of the cerium compound with a third species of ions (e.g. counter-ions).

The replacing of the ions may be effected, for example, by ion-exchange.

Cerium (IV) oxide hydrate is an example of a cerium compound which can be made dispersible in accordance with the invention.

10 Claims, No Drawings

PREPARATION OF DISPERSIBLE CERIUM COMPOUND

The present invention relates to the preparation of materials and finds application in the preparation of dispersible cerium compounds.

According to one aspect of the present invention there is provided a process for the preparation of a dispersible cerium compound which comprises replacing a first species of ions associated with a cerium compound by a second species of ions and subsequently replacing the second species of ions of the cerium compound by a third species of ions, thereby to produce a dispersible cerium compound.

The second species of ions may be, for example, hydroxyl ions.

By way of example, replacement of the first species of ion by the second species of ions and/or the replacement of the second species of ions by the third species of ions may be by ion-exchange.

The dispersible cerium compound having the third species of ions prepared in accordance with the present invention may be combined with a liquid such that the dispersible cerium compound disperses in the liquid to give a colloidal dispersion.

It will be understood that in this Specification "dispersible" means dispersible in a liquid to give a colloidal dispersion (i.e. a sol).

A colloidal dispersion prepared by dispersing in a liquid a dispersible cerium compound prepared in accordance with the present invention may be converted to a gel, for example, by any suitable technique for effecting a sol-gel transformation.

Ions associated with the cerium compound may be replaced by hydroxyl ions for example by contacting the cerium compound with a base. An example of a base suitable for use in accordance with the present invention is ammonium hydroxide ($NH_4OH$). It has been found that, by way of example, ammonium hydroxide may be used at a concentration of approximately 0.5M.

The ions associated with the cerium compound which may be replaced by hydroxyl ions may be ions which are present due to the preparative route used to prepare the cerium compound.

For example in the case of one type of commercially produced cerium (IV) oxide hydrate, nitrate ions are present. The presence of these nitrate ions is thought to inhibit the dispersibility of the cerium (IV) oxide hydrate and it is not possible to remove sufficient of these nitrate ions to achieve dispersibility to give sols of high concentration ($>300 g.l^{-1}$) merely by washing with water.

Thus, in accordance with one embodiment of the present invention, dispersible cerium (IV) oxide hydrate is prepared by a process wherein cerium (IV) oxide hydrate is treated with a base to replace nitrate ions associated with the hydrate with hydroxyl ions and subsequently hydroxyl groups on the hydrate are replaced by counter-ions.

By way of example, dispersible cerium (IV) oxide hydrate may be prepared by a process wherein cerium (IV) oxide hydrate is treated with a base to ion-exchange nitrate ions associated with the hydrate with hydroxyl ions and subsequently counter-ions are introduced by ion-exchange with hydroxyl groups on the hydrate.

The counter-ions in accordance with the immediately preceding embodiment of the present invention may be nitrate ions (e.g. which may be introduced by means of nitric acid treatment).

Although the counter-ions may be thought to be the same type of ions as ions removed initially and replaced by hydroxyl groups, the way in which they are present is believed to be quite different.

Thus, it is believed, though by no means certain, that the nitrate ions originally present on the hydrate are involved in "bridging" between crystallites in the hydrate, whereas in contrast the nitrate ions introduced as counter-ions are not; the counter-ions are believed to be sorbed on the hydrate.

It will be appreciated that, in an example of the present invention, the first species of ions and the third species of ions may be substantially the same; where the first species of ions and the third species of ions are substantially the same they may be present in a different way.

Counter-ions may be provided by use of any suitable source of ions (e.g. an acid or a salt). Where a salt is used it is possible to introduce a further cation to the cerium compound so that a mixed colloidal dispersion can be formed (i.e. a colloidal dispersion containing the starting cerium compound and an additional cation) and therefrom mixed gels may be formed.

Examples of a salt which may be used to provide counter-ions and an additional cation are metal salts (e.g. $NaNO_3$).

In another aspect the present invention provides a dispersible chemical compound whenever prepared by a process in accordance with the invention.

The invention will now be further described by way of example only as follows:

EXAMPLE 1

A 5.0 Kg batch of cerium (IV) oxide hydrate (ex Rhône-Poulenc) containing 72.0 % by weight oxide (ceria 20.9 moles) and 7.4% by weight nitrate (5.9 moles) was stirred for 5 minutes with 10.5 l of 0.54M ammonium hydroxide (5.67 moles $OH^-$) and then allowed to settle for 1 hour. The clear supernatant (9.2 l) was syphoned off and found to be 0.47M in nitrate (4.32 moles, 73%) and 0.18M in $OH^-$(1.65).

The residue was washed by stirring for 5 minutes with 10.0 l of demineralised water. After settling for 1.0 hour the wash liquor was separated off (10 l) to leave treated cerium (IV) hydrate. The wash liquor was found to be 0.094M in nitrate (0.94 moles, 16%). The total nitrate removed from the hydrate was now 5.26 moles which represents 89% of that originally associated with the ceria (IV) oxide hydrate.

A sample of the treated hydrate (32 g) was stirred with demineralised water (250 ml) to give slurry containing 58 $g.l^{-1}$ $CeO_2$ and having a conductivity of 0.6 mmhos and a pH of 8.0. Aqueous 1M nitric acid was added to the slurry and no significant increase in conductivity occurred until the nitric acid ($HNO_3$)/$CeO_2$ mole ratio reached a value of 0.16 to 0.18. At this point a rapid increase in conductivity was observed (3 mmhos with pH of 2.2) and the slurry peptised to form a semi-transparent sol.

EXAMPLE 2

A further sample (27.5 g) of the treated hydrate prepared as in Example 1 was stirred with demineralised water (100 ml) to give a slurry containing 125 $g.l^{-1}$ $CeO_2$ and having a conductivity of 1.2 mmhos and a pH of 8.0.

Aqueous 1M nitric acid was added to the slurry and no significant increase in conductivity occurred until the nitric acid ($HNO_3$)/$CeO_2$ mole ratio reached a value of 0.16 to 0.18. At this point a rapid increase in conductivity was observed (5 mmhos; pH of 2.2) and the slurry peptised to form a semi-transparent sol.

EXAMPLE 3

A further sample (30.7 g) of the treated hydrate prepared as in Example 1 was stirred with demineralised water (25 ml) to give a slurry containing 311 g.l$^{-1}$ $CeO_2$ and having a pH of 8.0 and a conductivity of 3.4 mmhos.

Aqueous 1M nitric acid was added to the slurry and no significant increase in conductivity occurred until the nitric acid ($HNO_3$)/$CeO_2$ mole ratio reached 0.16 to 0.18. At this point a rapid increse in conductivity was observed (6 mmhos pH 2.2) and the slurry peptised to form a semi-transparent sol.

EXAMPLE 4

A further sample (28 g) of the treated hydrate prepared in Example 1 was stirred with demineralised water 40 ml) to give a slurry containing 417 g.l$^{-1}$ $CeO_2$ and having a conductivity of 5.2 mmho and a pH of 8.0.

Aqueous 1M nitric acid was added to the slurry and no significant increase in conductivity occurred until the $HNO_3$/$CeO_2$ mole ratio was 0.16 to 0.18.

At this point a rapid increase in conductivity was observed (8.2 mmho, pH 2.2) and the slurry peptised to form a semi-transparent sol.

I claim:

1. A process for the preparation of dispersible cerium compound which comprises replacing a first species of ions associated with a cerium compound by a second species of ions by ion-exchange and subsequently replacing the second species of ions of the chemical compound by a third species of ions, thereby to produce a dispersible cerium compound.

2. A process as claimed in claim 1 wherein the second species of ions comprises hydroxyl ions.

3. A process as claimed in claim 1 wherein replacement of the second species of ions by the third species of ions is by ion-exchange.

4. A process as claimed in claim 1 wheein the cerium compound is cerium (IV) oxide hydrate.

5. A process as claimed in claim 1 wherein cerium (IV) oxide hydrate is treated by ion exchange to replace nitrate ions associated with the hydrate with hydroxyl ions and subsequently hydroxyl groups on the hydrate are replaced by counter-ions to give a dispersible cerium (IV) oxide hydrate.

6. A process as claimed in claim 5 wherein cerium (IV) oxide hydrate is treated by ion exchange to ion-exchange nitrate ions associated with the hydrate with hydroxyl ions and subsequently counter-ions are introduced by ion-exchange with hydroxyl groups on the hydrate.

7. A process as claimed in claim 5 wherein the counter-ions are nitrate ions.

8. A process as claimed in claim 5 wherein counter-ions are provided from an acid or a salt.

9. A process as claimed in claim 1 wherein a further cation is introduced to the cerium compound.

10. A process as claimed in claim 9 wherein a metal salt is used to provide counter-ions and an additional cation.

* * * * *